US005579994A

United States Patent [19]
Davis, Jr. et al.

[11] Patent Number: 5,579,994
[45] Date of Patent: Dec. 3, 1996

[54] METHOD AND CONTROL SYSTEM FOR ADAPTIVELY CONTROLLING AN AUTOMOTIVE HVAC SYSTEM

[75] Inventors: Leighton I. Davis, Jr.; Robert W. Matteson, both of Ann Arbor; Gerhard A. Dage, Franklin, all of Mich.

[73] Assignee: Ford Motor Company, Dearborn, Mich.

[21] Appl. No.: 506,711

[22] Filed: Jul. 26, 1995

[51] Int. Cl.⁶ ........................................... F24F 7/00
[52] U.S. Cl. ........................... 236/49.3; 236/91 C
[58] Field of Search ..................... 236/49.3, 49.1, 236/91 R, 91 C, 91 E, 91 F, 44 R, 44 C; 62/161, 180, 176.1, 176.2, 176.3, 176.5, 176.6; 165/17, 20, 21, 28

[56] References Cited

U.S. PATENT DOCUMENTS

| | | | |
|---|---|---|---|
| 4,456,055 | 6/1984 | Yoshimi et al. | 165/12 |
| 4,858,824 | 8/1989 | Matsuda et al. | 236/94 |
| 4,890,666 | 1/1990 | Clark | 165/16 |
| 4,910,967 | 3/1990 | Takahashi | 62/161 X |
| 4,914,924 | 4/1990 | Takahashi | 236/91 C X |
| 5,078,316 | 1/1992 | Hara et al. | 236/49.3 |
| 5,165,595 | 11/1992 | Horio et al. | 236/49.3 |
| 5,167,365 | 12/1992 | Mitoshi et al. | 236/49.3 |
| 5,344,070 | 9/1994 | Akasaka et al. | 236/49.3 |
| 5,345,776 | 9/1994 | Komazaki et al. | 62/176.3 |
| 5,427,313 | 6/1995 | Davis, Jr. et al. | 236/49.3 |

Primary Examiner—Harry B. Tanner
Attorney, Agent, or Firm—Paul K. Godwin, Jr.; Roger L. May

[57] ABSTRACT

Method and control system for adaptively controlling an automotive HVAC (heating, ventilation and air conditioning) system using a blending or combination of strategies each of which is optimized towards a particular goal in controlling the HVAC system. The blending is based on a strategy alteration signal which, in turn, is based on information provided by the occupant of the vehicle in combination with existing information available to an EATC (Electronic Automatic Temperature Control) system to adapt the optimized strategies to the occupant's preferences. The method and control system allow the response of the climate control system to change according to indications of occupant's preferences and/or detection of special conditions. The method and system provide an adaptive control strategy which utilizes pattern recognition and preference determination to blend the various strategies which include a base thermal comfort strategy.

20 Claims, 4 Drawing Sheets

METHOD AND CONTROL SYSTEM FOR ADAPTIVELY CONTROLLING AN AUTOMOTIVE HVAC SYSTEM

CROSS-REFERENCE TO RELATED APPLICATION

This application is related to U.S. patent application Ser. No. 08/083,757, U.S. Pat. No. 5,427,313, entitled "Method And Control System For Controlling An Automotive HVAC System To Prevent The Discharge Of Air Within A Predetermined Temperature Range"; U.S. Ser. No. 08/083,587, entitled "Method And System For Predicting Air Discharge Temperature In A Control System Which Controls An Automotive HVAC System"; U.S. Ser. No. 08/083,589, U.S. Pat. No. 5,549,152, entitled "Method And System For Modifying A Linear Control Algorithm Which Controls An Automotive HVAC System"; and U.S. Ser. No. 08/083,756, entitled "Method And Control System For Controlling An Automotive HVAC System", all of which have the same inventive entity, are assigned to the same assignee, and have the same filing date of Jun. 30, 1993.

This application is also related to U.S. patent application Ser. No. 08/363,085, filed Dec. 23, 1994, U.S. Pat. No. 5,516,041, entitled "Method And Control System For Controlling An Automotive HVAC System To Prevent Fogging"; U.S. Ser. No. 08/361,407, filed Dec. 22, 1994, U.S. Pat. No. 5,553,776, entitled "Method And Control System For Economically Controlling An Automotive HVAC System"; and U.S. Ser. No. 08/363,076, filed Dec. 23, 1994, entitled "Method and Control System For Controlling An Automotive HVAC System For Increased Occupant Comfort", and all of which have the same inventive entity, are assigned to the same assignee, and which are hereby incorporated in their entirety by reference.

TECHNICAL FIELD

This invention relates to methods and control systems for controlling an automotive HVAC system and, in particular, to methods and control systems for adaptively controlling an automotive HVAC.

BACKGROUND ART

A fundamental goal of automotive heating, ventilating, and air conditioning (HVAC) systems is to make vehicle occupants comfortable. To achieve this goal, it is important that the design of the control system that establishes cabin conditions takes into account the relationship between comfort and the variables that affect comfort. Human comfort is a complex reaction, involving physical, biological, and psychological responses to the given conditions. Because of this complexity, the engineer must consider many variables and their possible interaction in the design strategy of such a control system or controller.

In addition to the current difficulties, new vehicle lines create additional problems that are not easy to overcome. The reduction in interior and under hood package space in current vehicle designs has caused the transfer function for discharge temperature to be even more nonlinear, especially when operating at the extremes of ambient temperature.

It is often desirable to adapt a control strategy to a customer's or driver's preferences as well as the detection of special conditions thereby changing the response of the HVAC system.

The U.S. Pat. No. to Hara et al. 5,078,316 discloses computer controlled temperature regulation of an automobile in which the user's request modifies the automatic temperature control. The computer receives input of ambient temperature, cabin temperature, insulation temperature and a cabin temperature setting. User modification signals are also inputted and the automatic temperature control is modified in response to the user signal.

SUMMARY OF THE INVENTION

An object of the present invention is to provide a method and control system for adaptively controlling an automotive HVAC system according to a customer's preference and/or special conditions by blending various optimized control strategies.

In carrying out the above object and other objects of the present invention, a method is provided for adaptively controlling a heating, ventilation and air conditioning (HVAC) system of a vehicle which discharges a flow of air to a passenger cabin of the vehicle. The system includes a variable speed blower, means for varying air temperature, ducting, and actuators having various control positions for controlling the direction of air flow and the ratio of fresh air to recirculated air. The system further includes a humidity sensor for sensing relative humidity within the cabin, and temperature sensors for sensing temperature within the cabin and ambient temperature to generate in-car and ambient temperature signals, respectively, and a temperature sensor for sensing a set point temperature, which is adjustable by an occupant of the vehicle. The method includes the steps of determining relative humidity, temperature within cabin and ambient temperature based on the humidity signal and the in-car and ambient temperature signals, respectively. The method also includes the step of determining a base strategy for controlling the HVAC system and determining at least one other strategy optimized towards a particular goal in controlling the HVAC system based on the relative humidity, temperature within the cabin and the ambient temperature. The method further includes the steps of receiving occupant-generated input signals from the occupant of the vehicle, generating a strategy alteration signal based on the occupant-generated input signals and blending the base strategy and the at least one other strategy to produce an overall strategy based on the strategy alteration signal. Finally, the method includes the step of generating control signals to control the position of at least one actuator and the speed of the blower to cause the system to discharge air into the cabin having a desired temperature and flow based on the overall strategy.

Preferably, the HVAC system also includes cooling means for cooling air in the ducting and a control element having control positions for varying refrigerant capacity of the cooling means and wherein the at least one other strategy is an economy strategy.

Further in carrying out the above object and other objects of the present invention, a system is provided for carrying out the above method steps.

Still further in carrying out the above objects and other objects of the present invention, a method is provided for adaptively controlling a heating, ventilation and air conditioning (HVAC) system of a vehicle which discharges a flow of air to a passenger cabin of the vehicle. The system includes a variable speed blower, means for varying air temperature, ducting, and actuators having various control positions for controlling the direction of air flow and the ratio of fresh air to recirculated air. The method includes the step of determining a base strategy for controlling the HVAC system and determining at least one other strategy optimized towards a particular goal in controlling the HVAC system. The method further includes the steps of receiving occupant-generated input signals from the occupant of the vehicle, generating a strategy alteration signal based on the occupant-generated input signals, and blending the base strategy and the at least one other strategy to produce an overall strategy based on the strategy alteration signal. Finally, the method includes the step of generating control signals to control the position of at least one actuator and the speed of the blower to cause the system to discharge air into the cabin having a desired temperature and flow based on the overall strategy.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
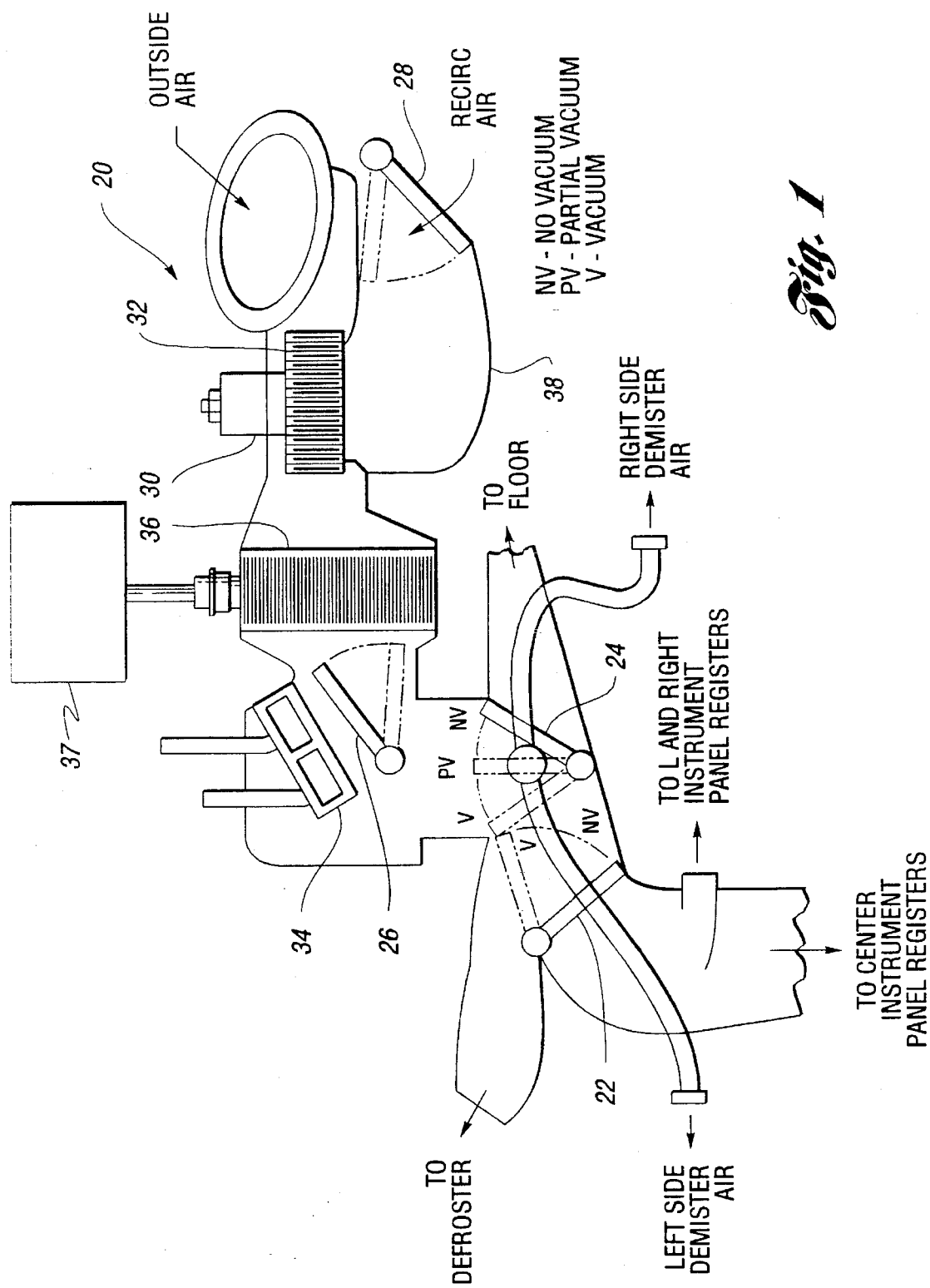
FIG. 1 is a schematic diagram illustrating an air handling system which can be controlled by the method and control system of the present invention.

In general, control of temperature and air flow (and to a lesser extent, humidity) within an automobile is accomplished using various actuators to affect the temperature and flow of air supplied to the cabin of the vehicle. FIG. 1 shows schematically an air handling system of an HVAC (heating, ventilation and air conditioning) system, generally indicated at 20. The system 20 includes the arrangement of panel-defrost, floor-panel, temperature blend and outside recirculated air actuators or doors 22, 24, 26 and 28, respectively. The doors 22 and 24 are preferably driven by vacuum motors (not shown) between their various vacuum, partial vacuum and no vacuum positions in a conventional fashion as indicated in FIG. 1. The door 26 is driven by an electric servo motor also in a conventional fashion. The door 28 may also be driven by an electric servo motor so that the position of the door 28 is continuously variable.

The system 20 also includes a variable speed blower motor 30 including a blower wheel 32.

The system further includes heating and cooling elements such as a heater core 34 and an evaporator core 36 of a typical vehicle air conditioning plant. Each of the above components is connected via ducting 38 in order to control temperature, the direction of air flow and the ratio of fresh air to recirculated air to control humidity.

For automatic control of the humidity, temperature and flow of air in the cabin, conditions within and outside the cabin are monitored by sensors and an electronic controller generates signals to control the plant actuators according to the conditions as indicated by the sensors. The evaporator temperature is controlled in a conventional automatic fashion to allow the system to dehumidify air moving thereover.

Figure 2:
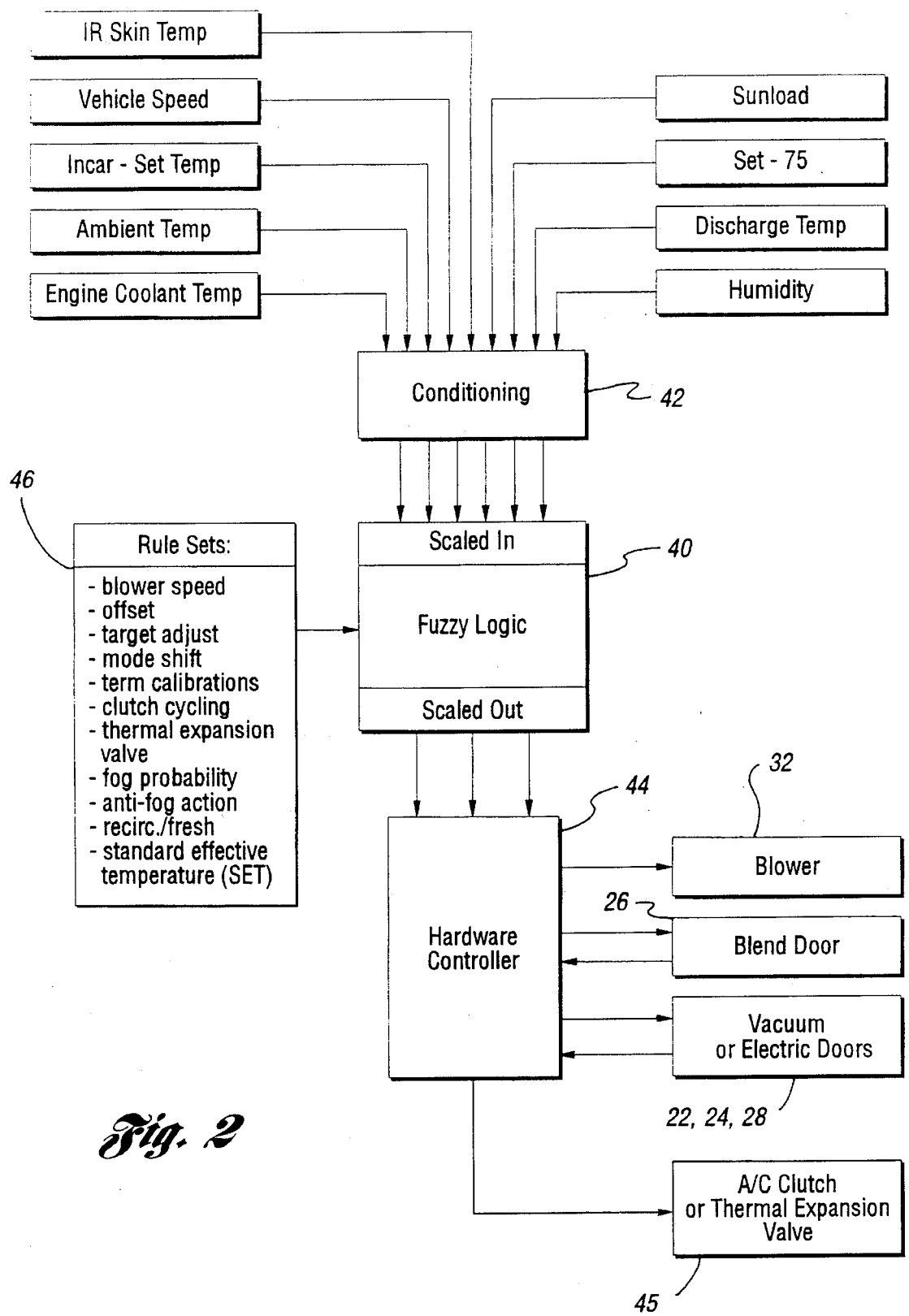
FIG. 2 is a schematic block diagram of a prior control system.

As illustrated in FIG. 2, a typical complement of sensors of the HVAC system provide signals which are representative of vehicle speed, IR skin temperature, in-car temperature, ambient (outside) air temperature, engine coolant temperature (ECT), discharge air temperature, humidity and sun load. In addition, there is a set signal or set point temperature value indicating the desired temperature that is set manually by the driver. In turn, an in-car-set or target temperature (in-car minus set temperature) signal and a set-75 (set or target temperature minus 75 degrees Fahrenheit) signal are generated or calculated.

The signals are provided to an electronic controller 40 as inputs after being conditioned by a conditioning circuit 42. The controller 40 scales the input signals and provides scaled output signals for use by a hardware controller 44 which, in turn, controls the doors 22 through 28, the blower 32 and the control element 45 to regulate the temperature and flow of air in the HVAC system.

In the block diagram of the fuzzy logic system of FIG. 2, sensor inputs are conditioned, scaled, and passed to a fuzzy inference engine of the controller 40. Rule sets 46 for the various control functions—blower speed, offset, target set point, mode shift, recirculation/fresh ratio, term calibrations, clutch cycling rate or expansion valve position, fog probability, anti-fog action, recirculation/fresh, standard effective temperature (SET), etc. provide the inference engine with the details of the strategy or strategies to be performed. Examples of such rule sets are found in the abovenoted applications which are incorporated by reference herein. The fuzzy outputs are scaled and passed to the routines to control the motors, actuators, and doors that accomplish the flow and conditioning of the air supplied to the passenger compartment and control element (i.e., A/C clutch or expansion valve). The rule set basis for control organizes the strategy or strategies in a manner that allows easy calibration and adjustment of the control operation.

The fuzzy logic climate controller 40 preferably uses a Motorola 68HC11 microprocessor for its calculations. This microprocessor has 512 bytes of RAM and 12 kilobytes of ROM built in. It uses an 8 megahertz clock providing a 500 nanosecond instruction cycle time. An analog-to-digital converter is integrated into the microprocessor.

The controller 40 is preferably programmed primarily in C and cross-compiled into microprocessor instructions. Each fuzzy rule set is incorporated into the fuzzy engine as a set of tables that have been previously converted into a form that allows for efficient calculation during run time. The fuzzy logic control procedure is called as part of the main loop, which is executed every 30 milliseconds. The fuzzy logic engine occupies approximately 600 bytes of ROM and uses 12 bytes of RAM during its execution. Execution time for a fuzzy calculation is typically 20 milliseconds.

This invention does not necessarily involve any new hardware, but uses software to interpret information currently available to the previously described EATC (Electronic Automatic Temperature Controller) in a novel fashion. In general, certain patterns of input (via buttons on the vehicle console, etc.) from the customer are detected and interpreted as indications of customer's preferences. Additionally, certain patterns of sensor inputs are also detected and interpreted as indicating that special conditions pertain where particular action should be taken. These interpretations of preferences or special conditions, in combination with information already available to the EATC via its sensors (cabin temperature and humidity, ambient temperature, blower speed, etc.) produce an alteration of the climate control strategy in a direction to satisfy the preferences or take the appropriate action.

Figure 3:
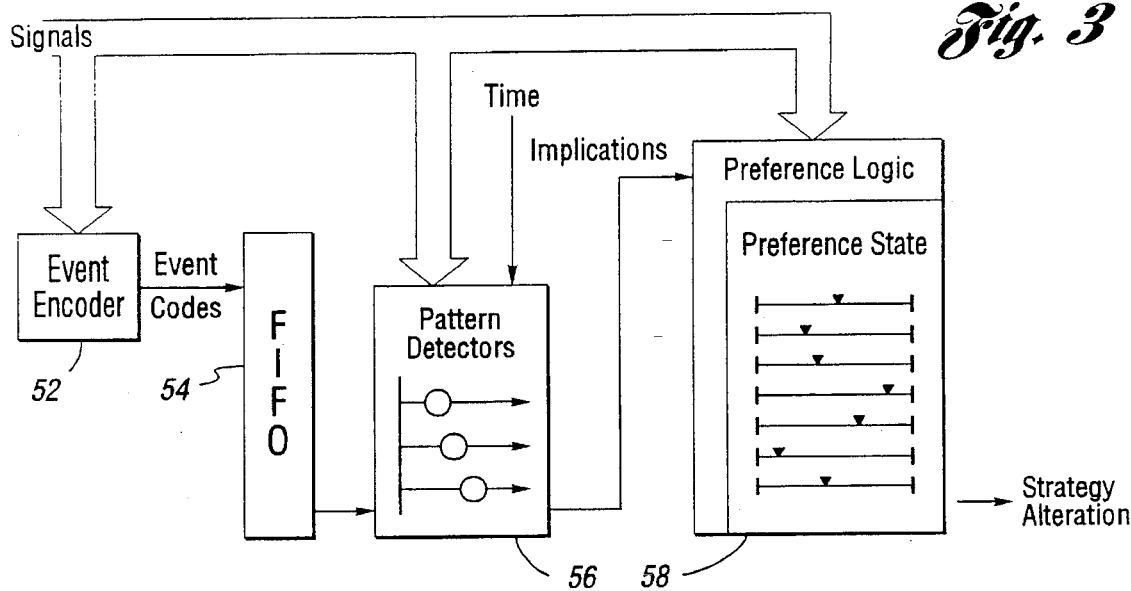
FIG. 3 is a schematic block diagram for event pattern recognition and preference determination of the present invention.
Figure 5:
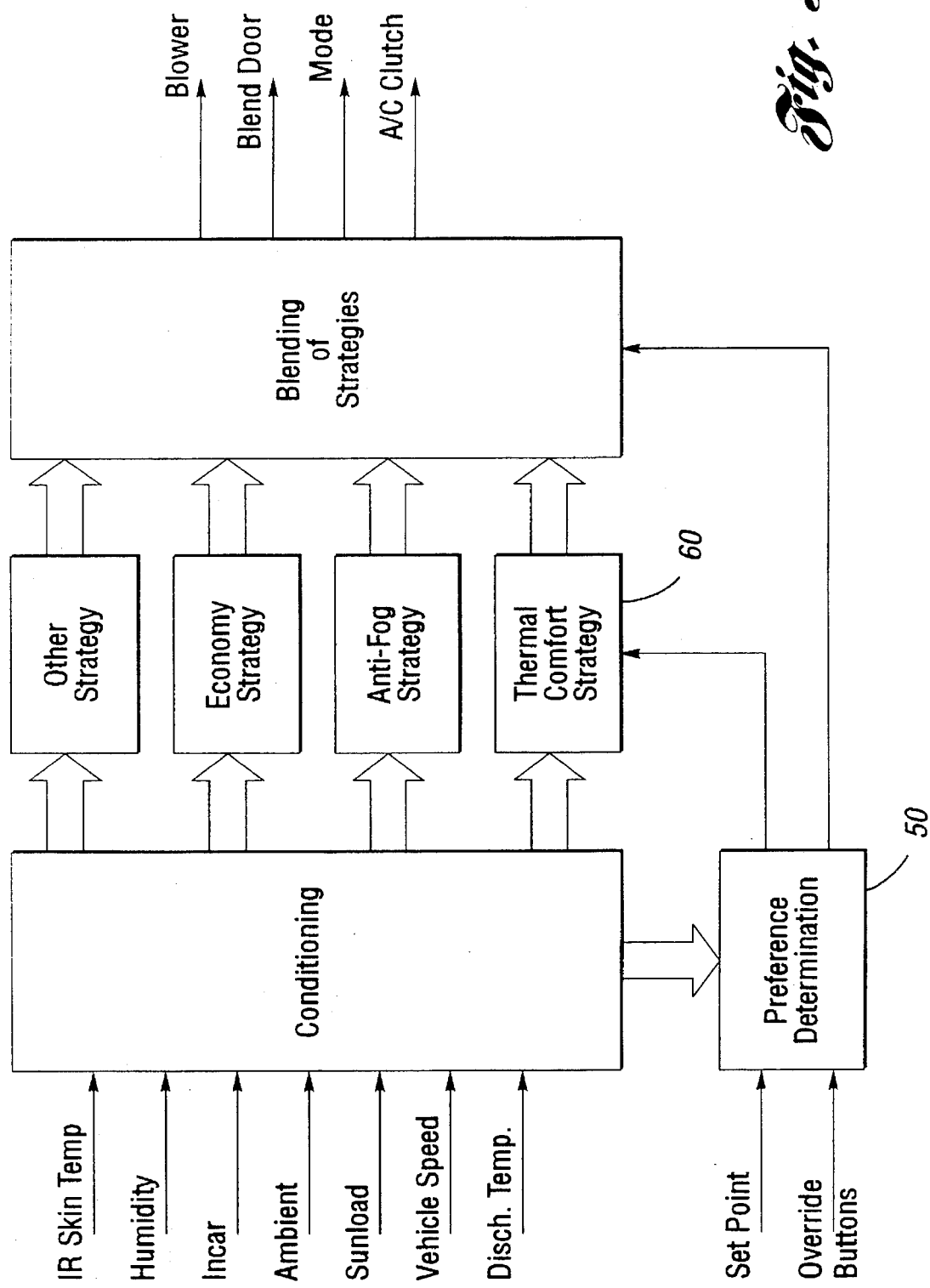
FIG. 5 is a block diagram illustrating adaptive control strategy blending implementations.

FIG. 3 is a detailed block diagram for a preference determination block 50 of FIG. 5. The block 50 interprets customer input and detects preference or special conditions and is comprised of four sections; an event encoder 52, a FIFO (i.e., first-in-first-out) buffer 54, a series of event pattern detectors 56, and preference determination logic 58. The event encoder 52 monitors the input signals from sensors, buttons, etc. and determines whether an "event" has occurred. This could be as simple as a button being pushed or as complicated as some threshold of a nonlinear function of the signals being exceeded. An event is encoded as a symbol (say, for example, the character "D" when the defroster button is pushed) and the symbol is passed to the FIFO buffer 54. The buffer 54 is necessary because more than one event may occur at a time.

The event stream is examined by a series of pattern detectors 56. The pattern detector may be, for example, a finite-state-machine (FSM) triggered by particular symbols, as described in K. S. Fu, "Syntactic Pattern Recognition and Applications", Prentice-Hall, Englewood Cliffs, N.J. (1982). The detectors 56 have available to them the signals, the system time, and potentially the outputs of other detectors, as well as the event stream. The detectors 56 can produce signals that influence preference values in the next block. These preference implication signals are processed by preference logic 58 and may change the setting of preference values therein.

Preference values fall into two general categories: some are numbers that indicate weighing factors for tradeoffs in strategy along a particular dimension. An example preference value of this sort might signify that the strategy should emphasize quiet operation of the blower over time-to comfort, for example. Another kind of preference value is used to map the customer's preference as to comfort. An example of this kind of preference value would be a parameter that offsets the target set point temperature as a function of ambient strategy. The accumulation of all such values constitute the "preference state".

Figure 4A:
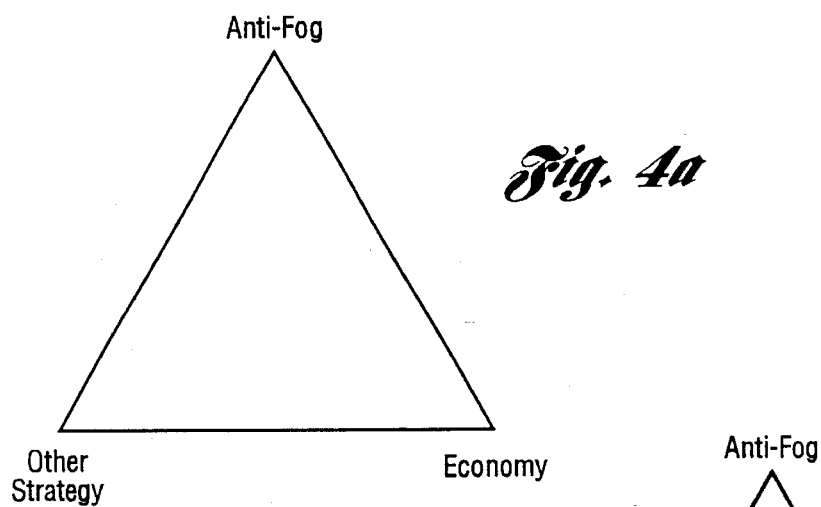
FIGS. 4a and 4b are preference diagrams for three trade-off strategy dimensions.

FIG. 4a shows a diagram that could be used to indicate the preference state when there are three preference dimensions such as anti-fog, economy, and any other optimized control strategy.

Figure 4B:
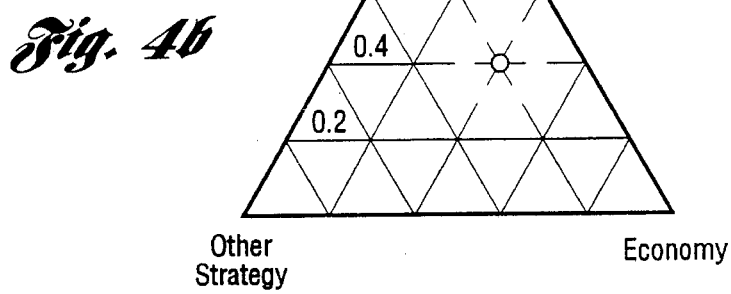

FIG. 4b indicates a particular preference state on this diagram and its decomposition along each dimension. (The point indicated has coordinates of 0.4, 0.4, and 0.2 in the directions of anti-fog, economy and some other optimized control strategy, respectively.) For these particular dimensions, the preference value might indicate deviation of the strategy away from a base strategy rather than trading off between two opposite valued strategies. The approach here is not necessarily to blend all strategies at the same time. It may be appropriate to play off two or three strategies against each other at a time in certain regions.

FIG. 5 is a block diagram of an overall system of the present invention that would blend several strategies including a base thermal comfort strategy 60 to produce an overall strategy. The overall approach is to derive a strategy that is a blending of different separate strategies, each complete, but optimized toward a particular goal. The base strategy 60 provides control under normal circumstances. The particular strategies are described in the above-noted applications which were incorporated by reference herein. The strategies are blended in under particular circumstances, or as otherwise indicated by the preference state. The advantage of this approach follows from the ability to detect and adapt to customer's wants and the consideration that complete assurance of control in every situation that an automobile climate control system encounters is not possible. There are too may variables not under control. A better approach is to adapt: to detect when special conditions such as incipient fogging occur and adjust the strategy accordingly, but also to allow some input from the operator to adjust the strategy further if necessary.

While the best mode for carrying out the invention has been described in detail, those familiar with the art to which this invention relates will recognize various alternative designs and embodiments for practicing the invention as defined by the following claims.

What is claimed is:

1. A method for adaptively controlling a heating, ventilation and air conditioning (HVAC) system of a vehicle which discharges a flow of air to a passenger cabin of the vehicle, the system including a variable speed blower, means for varying air temperature, ducting, actuators having various control positions for controlling the direction of air flow, and the ratio of fresh air to recirculated air, a humidity sensor for sensing relative humidity within the cabin to generate a humidity signal, and temperature sensors for sensing temperature within the cabin and ambient temperature to generate in-car and ambient temperature signals, respectively, and a temperature sensor for sensing set point temperature adjustable by an occupant of the vehicle, the method comprising the steps of:

determining relative humidity, temperature within the cabin and ambient temperature based on the humidity signal and in-car and ambient temperature signals, respectively;

determining a base strategy for controlling the HVAC system and determining at least one other strategy optimized towards a particular goal in controlling the HVAC system based on the relative humidity, temperature within the cabin and the ambient temperature;

receiving occupant-generated input signals from the occupant of the vehicle;

generating a strategy alteration signal based on the occupant-generated input signals;

blending the base strategy and the at least one other strategy to produce an overall strategy based on the strategy alteration signal; and generating control signals to control the position of at least one actuator and the speed of the blower to cause the system to discharge air into the cabin having a desired temperature and flow based on the overall strategy.

2. The method as claimed in claim 1 wherein the at least one other strategy is an anti-fog strategy.

3. The method as claimed in claim 1 wherein the base strategy is a thermal comfort strategy.

4. The method as claimed in claim 1 wherein the HVAC system also includes cooling means for cooling air in the ducting and a control element having control positions for varying refrigerant capacity of the cooling means and wherein the at least one other strategy is an economy strategy.

5. The method as claimed in claim 1 wherein the step of determining at least one other strategy determines a plurality of strategies, each of which is optimized towards a particular goal in controlling the HVAC system based on the relative humidity and the temperature within the cabin wherein the step of blending blends the base strategy with the plurality of strategies to obtain the overall strategy.

6. The method as claimed in claim 5 wherein the base strategy is a thermal comfort strategy.

7. The method as claimed in claim 1 wherein the step of generating the strategy alteration signal includes the steps of detecting a first pattern in the occupant-generated input signals and interpreting the first pattern as an indication of occupant preference to obtain a first set of implication signals and wherein the strategy alteration signal being based on the first set of implication signals.

8. The method as claimed in claim 7 further comprising the step of receiving sensor input signals from at least one of the sensors and wherein the step of generating the strategy alteration signal is also based on the sensor input signals.

9. The method as claimed in claim 8 wherein the step of generating the strategy alteration signal also includes the steps of detecting a second pattern in the sensor input signals and interpreting the second pattern to obtain a second set of implication signals and wherein the strategy alteration signal is also based on the second set of implication signals.

10. A method for adaptively controlling a heating, ventilation and air conditioning (HVAC) system of a vehicle which discharges a flow of air to a passenger cabin of the vehicle, the system including a variable speed blower, means for varying air temperature, ducting, actuators having various control positions for controlling the direction of air flow, and the ratio of fresh air to recirculated air, the method comprising the steps of:

determining a base strategy for controlling the HVAC system and determining at least one other strategy optimized towards a particular goal in controlling the HVAC system;

receiving occupant-generated input signals from the occupant of the vehicle;

generating a strategy alteration signal based on the occupant-generated input signals;

blending the base strategy and the at least one other strategy to produce an overall strategy based on the strategy alteration signal; and generating control signals to control the position of at least one actuator and the speed of the blower to cause the system to discharge air into the cabin having a desired temperature and flow based on the overall strategy.

11. A control system for adaptively controlling a heating, ventilation and air conditioning (HVAC) system of a vehicle which discharges a flow of air to a passenger cabin of the vehicle, the HVAC system including a variable speed blower, means for varying air temperature, ducting, actuators having various control positions for controlling the direction of air flow and the ratio of fresh air to recirculated air, a humidity sensor for sensing relative humidity within the cabin to generate a humidity signal, and temperature sensors for sensing temperature within the cabin and ambient temperature to generate in-car and ambient temperature signals, respectively, and a temperature sensor for sensing set point temperature adjustable by occupant of the vehicle, the system comprising:

means for determining relative humidity, temperature within the cabin and ambient temperature based on the humidity, in-car and ambient temperature signals, respectively;

means for determining a base strategy for controlling the HVAC system and means for determining at least one other strategy optimized towards a particular goal in controlling the HVAC system based on the relative humidity, temperature within the cabin and the ambient temperature;

means for generating a strategy alteration signal based on occupant-generated input signals from the occupant of the vehicle;

means for blending the base strategy and the at least one other strategy to produce an overall strategy based on the strategy alteration signal; and means for generating control signals to control the position of at least one actuator and the speed of the blower to cause the HVAC system to discharge air into the cabin having a desired temperature and flow based on the overall strategy.

12. The system as claimed in claim 11 wherein the at least one other strategy is an anti-fog strategy.

13. The system as claimed in claim 11 wherein the base strategy is a thermal comfort strategy.

14. The system as claimed in claim 11 wherein the HVAC system also includes cooling means for cooling air in the ducting and a control element having control positions for varying refrigerant capacity of the cooling means wherein the at least one other strategy is an economy strategy.

15. The system as claimed in claim 14 wherein the means for determining at least one other strategy determines a plurality of strategies, each of which is optimized towards a particular goal in controlling the HVAC system based on the relative humidity and the temperature within the cabin and wherein the means for blending blends the thermal comfort strategy with the plurality of strategies to obtain the overall strategy.

16. The system as claimed in claim 15 wherein the base strategy is a thermal comfort strategy.

17. The system as claimed in claim 16 wherein the plurality of strategies includes an anti-fog strategy.

18. The system as claimed in claim 11 wherein the means for generating the strategy alteration signal includes means for determining a first pattern in the occupant-generated input signals and means for interpreting the first pattern as an indication of occupant preference to obtain a first set of indication signals and wherein the strategy alteration signal is also based on the first set of implication signals.

19. The system as claimed in claim 18 further comprising means for receiving sensor input signals from at least one of the sensors wherein the strategy alteration signal is also based on the sensor input signals.

20. The system as claimed in claim 19 wherein the means for generating the strategy alteration signal includes means for detecting a second pattern in the sensor input signals and means for interpreting the second pattern to obtain a second set of implication signals and wherein the strategy alteration signal is also based on the second set of implication signals.

* * * * *